United States Patent
Park (10) Patent No.: US 9,465,105 B2
(45) Date of Patent: Oct. 11, 2016

(54) V2V COMMUNICATION-BASED VEHICLE IDENTIFICATION APPARATUS AND IDENTIFICATION METHOD THEREOF

(71) Applicant: MANDO CORPORATION, Pyeongtaek-si, Gyeonggi-do (KR)

(72) Inventor: Man Bok Park, Seoul (KR)

(73) Assignee: Mando Corporation, Pyeongtaek-si, Gyeonggi-do (KR)

(*) Notice: Subject to any disclaimer, the term of this patent is extended or adjusted under 35 U.S.C. 154(b) by 421 days.

(21) Appl. No.: 14/020,743

(22) Filed: Sep. 6, 2013

(65) Prior Publication Data

US 2014/0070980 A1    Mar. 13, 2014

(30) Foreign Application Priority Data

Sep. 7, 2012 (KR) .................. 10-2012-0099455

(51) Int. Cl.
*G01S 15/93* (2006.01)
*G01S 13/93* (2006.01)
(Continued)

(52) U.S. Cl.
CPC .............. *G01S 13/931* (2013.01); *G01S 13/86* (2013.01); *G01S 19/42* (2013.01); *G01S 2013/936* (2013.01); *G01S 2013/9353* (2013.01); *G01S 2013/9375* (2013.01)

(58) Field of Classification Search
CPC ...................................................... G01S 13/86
USPC ........................................................... 342/70
See application file for complete search history.

(56) References Cited

U.S. PATENT DOCUMENTS 5,907,293 A * 5/1999 Tognazzini .......... B60W 40/04
340/436

6,025,797 A * 2/2000 Kawai ................ B60K 31/0008
342/175
(Continued)

FOREIGN PATENT DOCUMENTS

EP    0 817 152 A1    1/1998

OTHER PUBLICATIONS

Chapter 2 Environment Characteristic Positioning of Mobile Robot Based on Probability, Thesis for Master's Degree of Wuhan University of Technology with partial English translation.

(Continued)

*Primary Examiner* — John B Sotomayor
*Assistant Examiner* — Marcus Windrich
(74) *Attorney, Agent, or Firm* — McDermott Will & Emery LLP (57) ABSTRACT

Disclosed herein are a vehicle-to-vehicle (V2V) communication-based vehicle identification apparatus and an identification method thereof. The V2V communication-based vehicle identification apparatus includes a radar sensor unit sensing radar information corresponding to relative distances to object vehicles, a GPS module unit generating GPS information from GPS satellites, a V2V communication unit transmitting the generated GPS information to the object vehicles and receiving GPS information of the object vehicles from the object vehicles through vehicle to vehicle (V2V) communication, and a controller calculating probabilities that the GPS information of the object vehicles will be located at areas, set based on the sensed radar information, and identifying vehicles corresponding to the radar information and the GPS information of the object vehicles based on the calculated probabilities.

7 Claims, 7 Drawing Sheets

(51) Int. Cl.
*G01S 13/86* (2006.01)
*G01S 19/42* (2010.01)

(56) References Cited

U.S. PATENT DOCUMENTS

| | | | | |
|---|---|---|---|---|
| 6,615,137 B2* | 9/2003 | Lutter | ............ | G08G 1/0965 340/436 |
| 7,382,274 B1* | 6/2008 | Kermani | ............ | B60K 31/0058 340/435 |
| 9,020,746 B2* | 4/2015 | Aono | ............ | G01S 13/931 701/300 |
| 9,084,190 B2* | 7/2015 | Noh | ............ | H04W 56/001 |
| 2007/0016372 A1* | 1/2007 | Browne | ............ | G01C 21/32 701/469 |
| 2010/0198513 A1* | 8/2010 | Zeng | ............ | B60W 40/02 701/300 |

OTHER PUBLICATIONS

Chinese Office Action issued in Chinese Patent Application No. 201310404089.3 on Apr. 23, 2015; 6 pages.

* cited by examiner

V2V COMMUNICATION-BASED VEHICLE IDENTIFICATION APPARATUS AND IDENTIFICATION METHOD THEREOF

CROSS-REFERENCE TO RELATED APPLICATION

This application claims the benefit of Korean Patent Application No. 2012-0099455, filed on Sep. 7, 2012 in the Korean Intellectual Property Office, the disclosure of which is incorporated herein by reference.

BACKGROUND

1. Field

Embodiments of the present invention relate to a vehicle-to-vehicle (V2V) communication-based vehicle identification apparatus which identifies neighboring vehicles by receiving GPS information from neighboring vehicles, and an identification method thereof.

2. Description of the Related Art

In general, a collision warning system is a safety apparatus which senses dangers of collision by detecting the positions of a road and neighboring vehicles using a sensor in place of human sense, warns a driver of risk of accident through visual and auditory sensing units and a tactile sensing unit, and helps the driver recognizing the risk of accident to cope with an accident.

Collision warning systems include a forward collision warning (FCW) system, a blind spot warning system (BSW) system, etc.

A collision warning system detects the position of its personal vehicle using a global positioning system (GPS), transfers position information on its personal vehicle, i.e., GPS information, to neighboring vehicles using a V2V communication technique, detects the positions of the neighboring vehicles by receiving GPS of the neighboring vehicles in real time, and calculates distances to the neighboring vehicles, thus reducing risk of accident.

A V2V communication-based vehicle identification apparatus applied to such a collision warning system receives various pieces of data, such as GPS information, from neighboring vehicles. In order to use such data, vehicle identification to detect from which vehicle the data is received is required.

SUMMARY

Therefore, it is an aspect of the present invention to provide a vehicle-to-vehicle (V2V) communication-based vehicle identification apparatus which identifies neighboring vehicles based on stochastic analysis using GPS information and radar sensing information, and an identification method thereof.

Additional aspects of the invention will be set forth in part in the description which follows and, in part, will be obvious from the description, or may be learned by practice of the invention.

In accordance with one aspect of the present invention, a V2V communication-based vehicle identification apparatus includes a radar sensor unit sensing radar information corresponding to relative distances to object vehicles, a GPS module unit generating GPS information from GPS satellites, a V2V communication unit transmitting the generated GPS information to the object vehicles and receiving GPS information of the object vehicles from the object vehicles through vehicle to vehicle (V2V) communication, and a controller calculating probabilities that the GPS information of the object vehicles will be located at areas, set based on the sensed radar information, and identifying vehicles corresponding to the radar information and the GPS information of the object vehicles based on the calculated probabilities.

The controller may set oval areas as areas where the object vehicles are located based on the sensed radar information.

The oval areas may be oval areas in which only linear motion is permitted without rotation.

The controller may calculate the probabilities $Bel(x_t)$ that the GPS information of the object vehicles will be located using Equation 1 below, $$bel(x_t) = \eta p(z_t \mid x_t)\overline{bel(x_t)} \quad \text{[Equation 1]}$$

$$\overline{Bel(x_{t+1})} = \int p(x_{t+1} \mid x_t)bel(x_t)dx_t$$

$$= \sum_{x_t} p(x_{t+1} \mid x_t)bel(x_t)$$

here, $\eta$ may be a normalization constant, $z_t$ may be an improved relative distance between a processed GPS position and a radar position, $p(z_t|x_t)$ may be a measurement accuracy probability, and $p(x_t+1|x_t)$ may be a state transition update probability.

The controller may select combinations, the calculated probability values of which are large, and identify vehicles corresponding to the radar information and the GPS information of the selected combinations.

In accordance with another aspect of the present invention, a V2V communication-based vehicle identification method includes sensing radar information corresponding to relative distances to object vehicles, receiving GPS information of the object vehicles from the object vehicles, setting oval areas as areas where the object vehicles are located based on the sensed radar information, calculating probabilities that the GPS information of the object vehicles will be located at the set oval areas, and identifying vehicles corresponding to the radar information and the GPS information of the object vehicles based on the calculated probabilities.

The oval areas may be oval areas in which only linear motion is permitted without rotation.

The probabilities $Bel(x_t)$ that the GPS information of the object vehicles will be located may be calculated using Equation 1 below, $$bel(x_t) = \eta p(z_t \mid x_t)\overline{bel(x_t)} \quad \text{[Equation 1]}$$

$$\overline{Bel(x_{t+1})} = \int p(x_{t+1} \mid x_t)bel(x_t)dx_t$$

$$= \sum_{x_t} p(x_{t+1} \mid x_t)bel(x_t)$$

here, $\eta$ may be a normalization constant, $z_t$ may be an improved relative distance between a processed GPS position and a radar position, $p(z_t|x_t)$ may be a measurement accuracy probability, and $p(x_t+1|x_t)$ may be a state transition update probability.

The V2V communication-based vehicle identification method may further include selecting combinations, the calculated probability values of which are large, and identifying vehicles corresponding to the radar information and the GPS information of the selected combinations.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout. In the following description of the present invention, a detailed description of known functions and configurations incorporated herein will be omitted when it may make the subject matter of the present invention rather unclear. In the drawings, the widths, the lengths, the thicknesses, etc. of elements may be exaggerated for convenience of description. Further, in the drawings, the same or similar elements are denoted by the same reference numerals even though they are depicted in different drawings.

Figure 1:
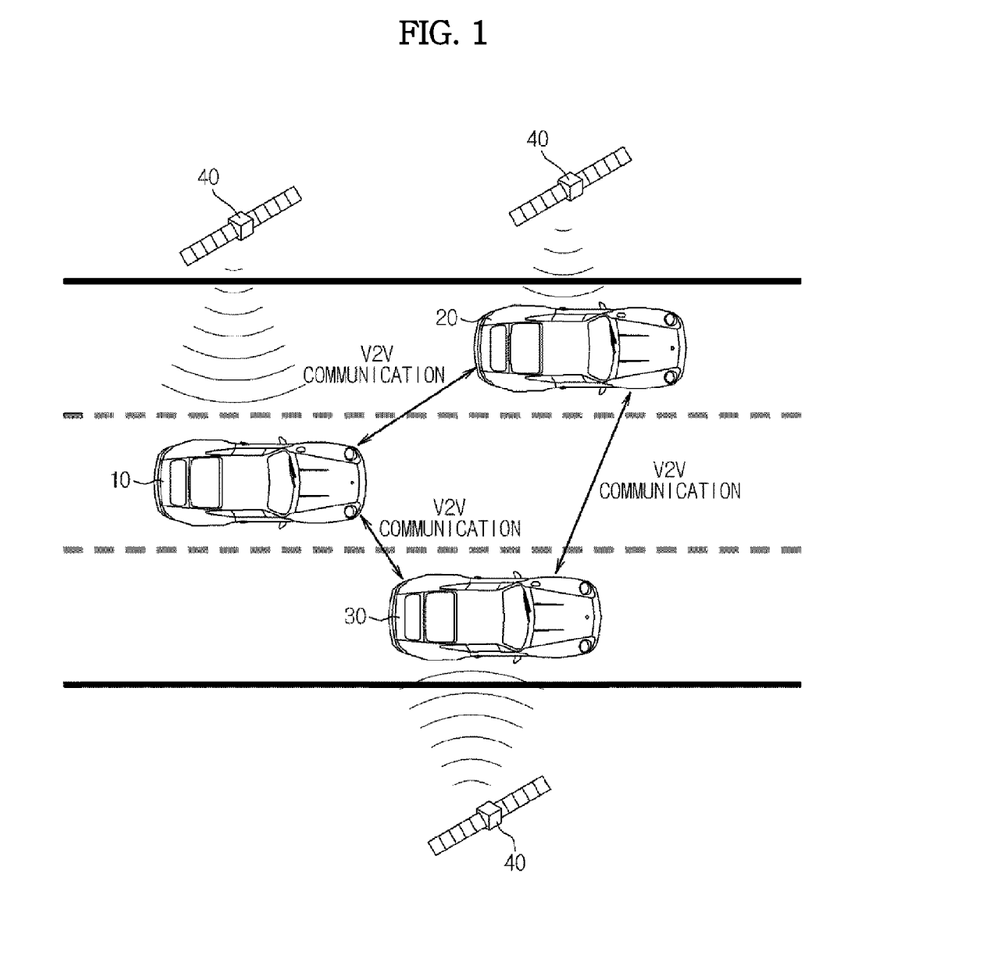
FIG. 1 is a view illustrating the configuration of a collision warning system to which a V2V communication-based vehicle identification apparatus in accordance with one embodiment of the present invention is applied.

FIG. 1 is a view illustrating the configuration of a collision warning system to which a V2V communication-based vehicle identification apparatus in accordance with one embodiment of the present invention is applied.

With reference to FIG. 1, a personal vehicle 10 and plural object vehicles 20 and 30 around the vehicle 10 are provided so as to be communicable with each other. The respective vehicles 10, 20, and 30 exchange information through V2V communication among V2V communication-based vehicle identification apparatuses provided on the respective vehicles 10, 20, and 30.

Further, the personal vehicle 10 and the plural object vehicles 20 and 30 receive GPS information of the respective vehicles 10, 20, and 30 through GPS communication with GPS satellites 40. The V2V communication-based vehicle identification apparatuses provided on the respective vehicles 10, 20, and 30 receive GPS information through GPS communication with the GPS satellites 40.

Figure 2:
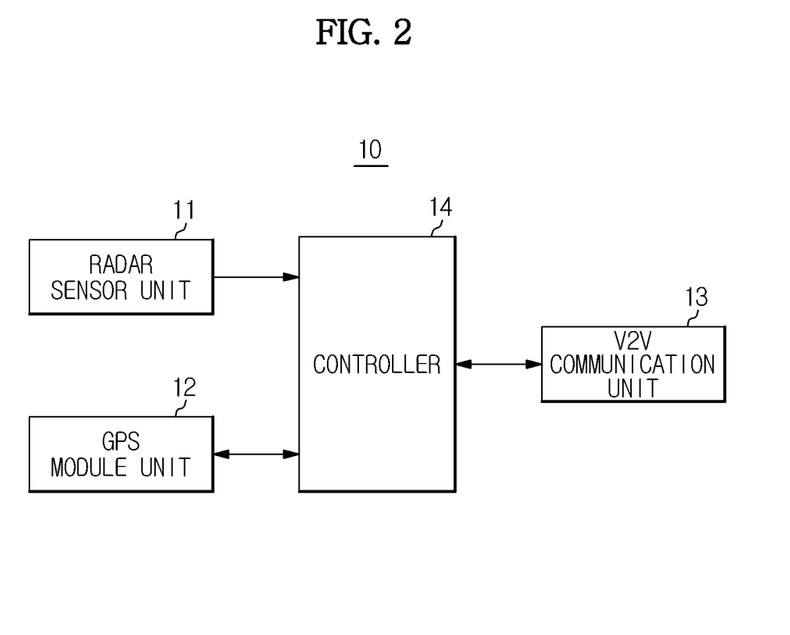
FIG. 2 is a control block diagram of the V2V communication-based vehicle identification apparatus in accordance with the embodiment of the present invention.

FIG. 2 is a control block diagram of the V2V communication-based vehicle identification apparatus in accordance with the embodiment of the present invention.

With reference to FIG. 2, the V2V communication-based vehicle identification apparatus provided on the personal vehicle 10, for example, a communication-based vehicle identification apparatus, includes a radar sensor unit 11, a GPS module unit 12, a V2V communication unit 13, and a controller 14.

The radar sensor unit 11 senses relative distances between the personal vehicle 10 and the object vehicles 20 and 30.

The GPS module unit 12 receives GPS satellite signals from the GPS satellites 40 and generates position information of the vehicle 10.

The GPS module unit 12 generates GPS information including GPS position coordinates (x,y), driving direction θ, current velocity v, etc. of the vehicle 10.

Here, the GPS position coordinates may be extracted through the GPS module unit 12, the driving direction θ may be the absolute angle of the current moving direction of the vehicle 10, and the current velocity v may be confirmed through the GPS module unit 12 or a speedometer of the vehicle 10.

The V2V communication unit 13 transmits the GPS information of the personal vehicle 10 to the neighboring vehicles 20 and 30 and receives GPS information of the neighboring vehicles 20 and 30 from the neighboring vehicles 20 and 30 through V2V communication.

The controller 14 performs overall vehicle identification control. That is, the controller 14 identifies the neighboring vehicles 20 and 30 based on stochastic analysis using GPS information and radar sensing information.

Hereinafter, a process of identifying neighboring vehicles through the controller 14 based on stochastic analysis using GPS information and radar sensing information will be described in more detail.

The position of object vehicles sensed by the radar sensor unit 11 may be expressed as x, y coordinates. GPS information, i.e., the position information of the object vehicles received through communication, may be converted into x, y coordinates.

Figure 3:
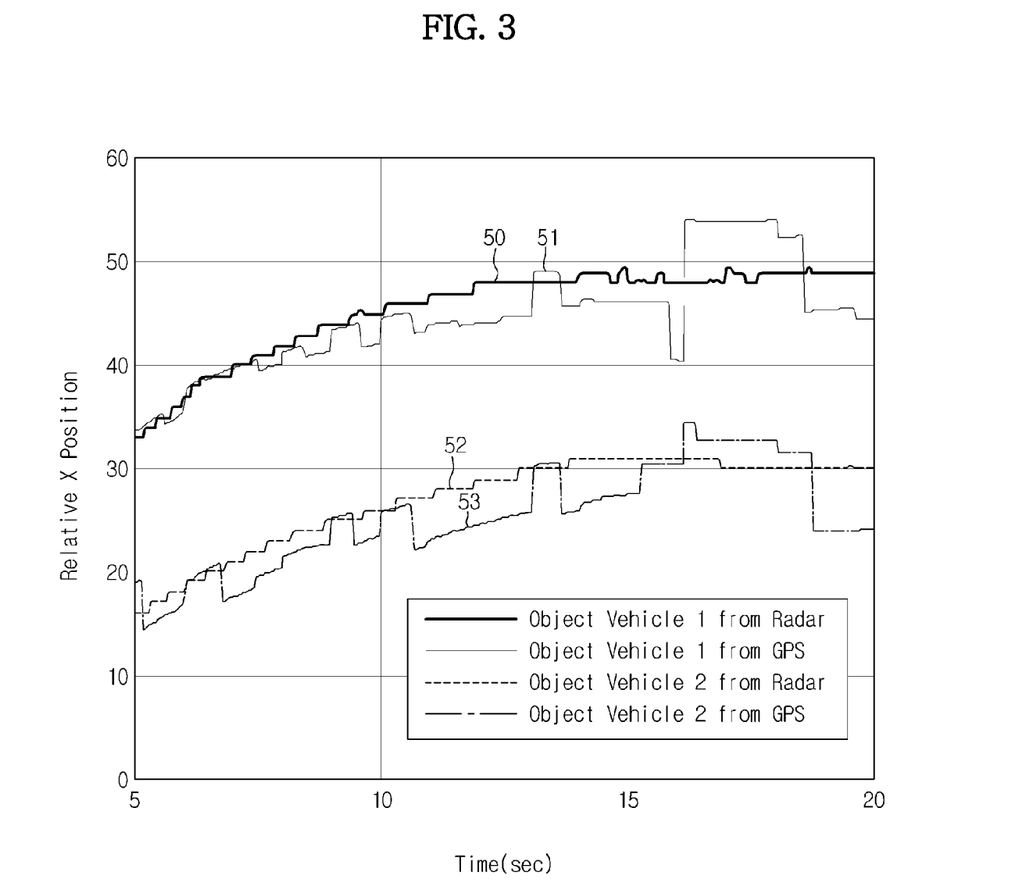
FIG. 3 is a graph illustrating relative distances due to radar and relative distances due to GPS in the V2V communication-based vehicle identification apparatus in accordance with the embodiment of the present invention.

FIG. 3 is a graph illustrating relative distances due to radar and relative distances due to GPS in the V2V communication-based vehicle identification apparatus in accordance with the embodiment of the present invention.

With reference to FIG. 3, reference numeral 50 is radar information of the first object vehicle 20, and reference numeral 51 is GPS information of the first object vehicle 20.

Further, reference numeral 52 is radar information of the second object vehicle 30, and reference numeral 53 is GPS information of the second object vehicle 30.

If these pieces of information are provided, the respective pieces of information are basic factors in function development using communication to identify the first object vehicle 20 and the second object vehicle 30.

Figure 4A:
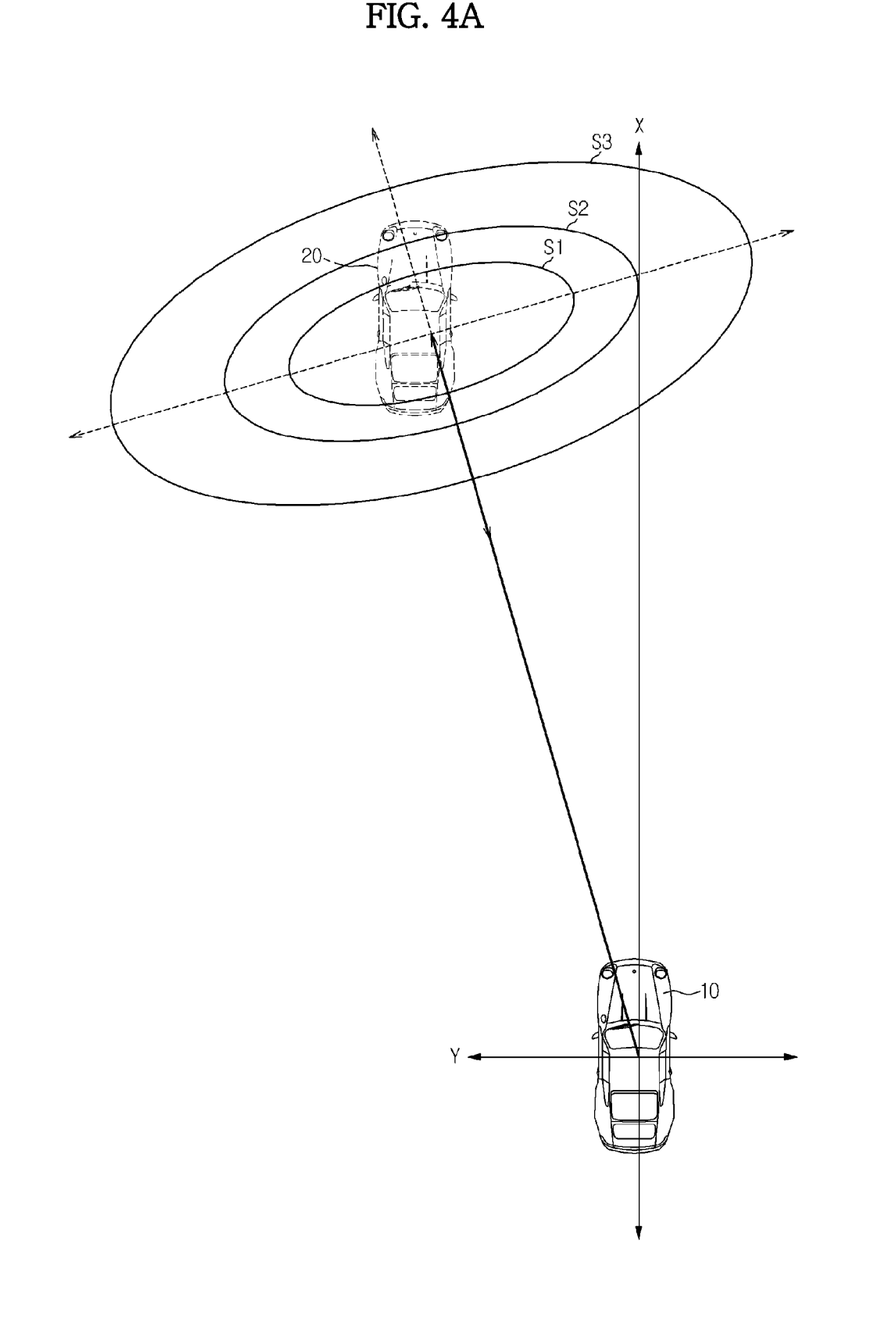
FIG. 4A is a view illustrating general radar probabilities in the V2V communication-based vehicle identification apparatus in accordance with the embodiment of the present invention.
Figure 4B:
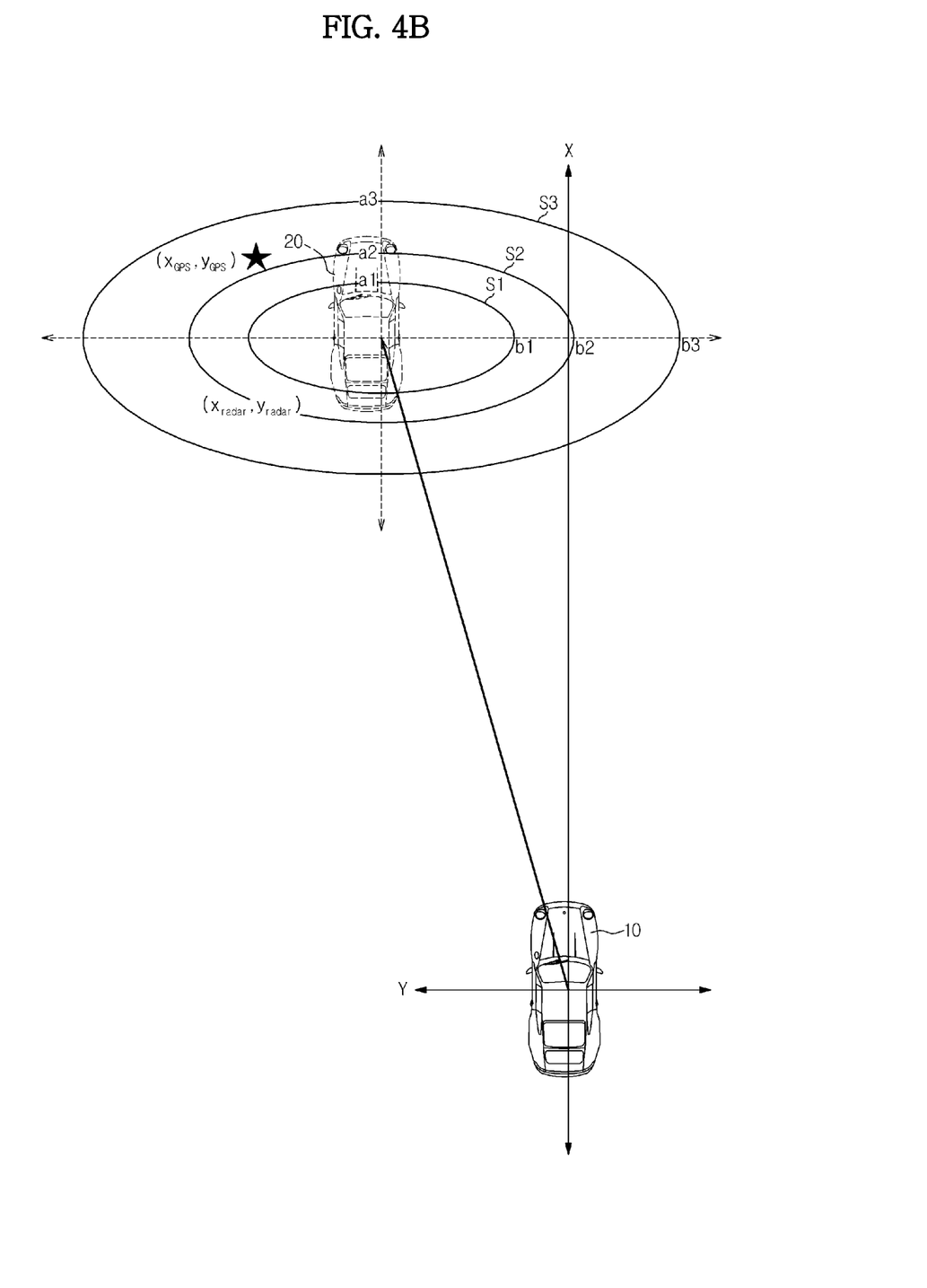
FIG. 4B is a view illustrating modified radar probabilities in the V2V communication-based vehicle identification apparatus in accordance with the embodiment of the present invention.

FIG. 4A is a view illustrating general radar probabilities in the V2V communication-based vehicle identification apparatus in accordance with the embodiment of the present invention, and FIG. 4B is a view illustrating modified radar probabilities in the V2V communication-based vehicle identification apparatus in accordance with the embodiment of the present invention.

It is known that radar is relatively accurate in the longitudinal direction but is inaccurate in the transversal direction.

It is assumed that radar has oval-shaped probabilities, as exemplarily shown in FIG. 4A.

Since a commercial GPS has an error of 10 m to 20 m, radar is as a reference signal in this embodiment.

Radar probability calculation shown in FIG. 4A should be performed, but it is difficult to actually perform such calculation due to characteristics of radar. Further, since there is uncertainty of radar, the above assumption is uncertain. In consideration of two facts, a radar probability is converted from an oval shape shown in FIG. 4A to an oval shape shown in FIG. 4B, in which only linear motion is permitted without rotation. Here, the probability is calculated according to the position of x, y coordinates ($x_{GPS}$, $y_{GPS}$) acquired through GPS. That is, the radar probability is set to an oval area, and a formula of an oval area in which only linear motion is permitted without rotation is used for convenience of calculation.

$$\frac{(x-x_{GPS})^2}{a_0^2} + \frac{(y-y_{GPS})^2}{b_0^2} \leq 1 \quad \text{[Formula 1]}$$

Here, x and y represent coordinates of a point which is assumed to be the actual position of the vehicle, and $a_0$ and $b_0$ represent a pair of focal points a1 and b1, a2 and b2, or a3 and b3 of ovals corresponding to probability areas s1, s2, and s3.

Thereafter, the probability is calculated using the equation below.

Here, the probability is calculated using Belief theory.

$x_t$=ID_Conformed or $x_t$=ID_Not_Conformed. $x_t$ may represent ID conformity or ID nonconformity.

$z_t$ is an improved relative distance between a processed GPS position and a radar position.

If the GPS position and the radar position confirm with each other and are recognized as information of one vehicle, $x_t$ has a value of '1'.

$z_t$ is a relative distance (x, y), i.e., distance information calculated using GPS information, etc.

$p(z_t|x_t)$ is a measurement accuracy probability (measurement update equation).

$p(x_{t+1}|x_t)$ is a state transition update probability (time update equation).

Prior and posterior belief values $Bel(x_t)$, $Bel(x_{t+1})$ are calculated by Equation 2 below using localization (for example, Markov localization).

$$\overline{Bel(x_{t+1})} = \int p(x_{t+1}|x_t)bel(x_t)dx_t \quad \text{[Equation 2]}$$
$$= \sum_{x_t} p(x_{t+1}|x_t)bel(x_t)$$

Equation 2 may be expressed as Equation 3 below $$bel(x_t)=\eta p(z_t|x_t)\overline{bel(x_t)} \quad \text{[Equation 3]}$$

Here, $\eta$ is a normalization constant, $Bel(x_t)$ is a prior belief value, i.e., a prior probability value of the position x, and $Bel(x_t+1)$ is a posterior belief value, i.e., a posterior probability value of the position x.

$Bel(x_t)$ is a probability value. As $Bel(x_t)$ approaches 1, accuracy is increased.

In Markov localization, the position of an object vehicle is estimated using GPS information for an oval area determined by random radar sensing information without prior knowledge. Through such Markov localization, rather than the assumption of a position where a vehicle is located, a probability distribution of all positions where one vehicle may be located may be managed.

In this way, radar sensing information is set as a reference, and an object vehicle is identified, i.e., whether or not the object vehicle is the first object vehicle or the second object vehicle or whether or not there is no corresponding object vehicle is judged, through fusion of the radar sensing information with GPS information.

Figure 5:
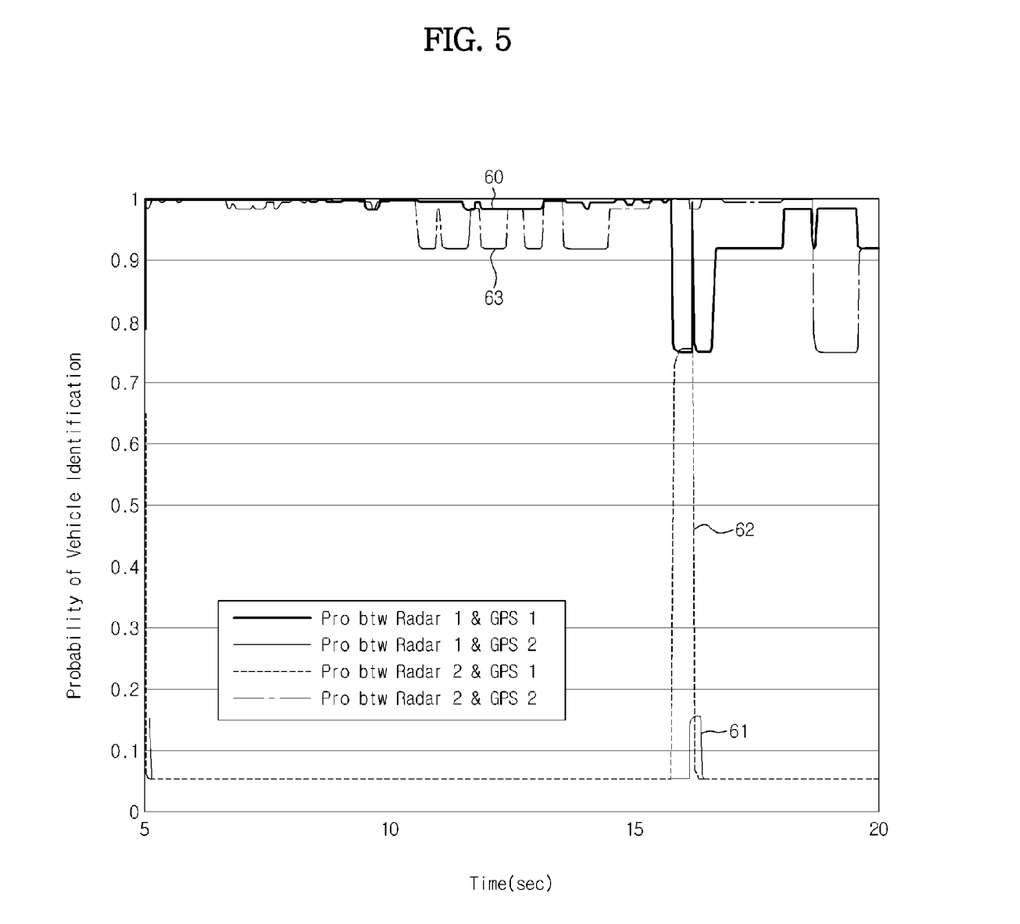
FIG. 5 is a graph illustrating results of calculation of probabilities of vehicle identification in the V2V communication-based vehicle identification apparatus in accordance with the embodiment of the present invention.

FIG. 5 is a graph illustrating a result of calculation of probabilities of vehicle identification in the V2V communication-based vehicle identification apparatus in accordance with the embodiment of the present invention.

With reference to FIG. 5, probabilities of four situations may be judged by combining radar sensing information and GPS information of the first object vehicle 20 and radar sensing information and GPS information of the second object vehicle 30.

That is, since two pieces of radar information radar 1 and radar 2 and two pieces of GPS information GPS 1 and GPS 2 are combined, four situations radar 1 & GPS 1 60, radar 1 & GPS 2 61, radar 2 & GPS 1 62, and radar 2 & GPS 2 63 are acquired.

As exemplarily shown in FIG. 5, as a result of calculation of probabilities of vehicle identification in the four situations, probability values of vehicle identification in the situations radar 1 & GPS 1 60 and radar 2 & GPS 2 63 are about 0.9 to 1, and thus, it may be understood that radar 1 and GPS 1 are information of the same vehicle and radar 2 and GPS 2 are information of the same vehicle. That is, it may be understood that the combination of radar 1 and GPS 1 and the combination of radar 2 and GPS 2 are effective combinations.

Thereby, it may be judged that radar 1 and GPS 1 are information corresponding to the first object vehicle 20 and it may be judged that radar 2 and GPS 2 are information corresponding to the second object vehicle 30.

However, probability values of vehicle identification in the situations radar 1 & GPS 2 61 and radar 2 & GPS 1 62 are about 0.1 to 0.2, and thus, it may be understood that radar 1 and GPS 2 are not information of the same vehicle and radar 2 and GPS 1 are not information of the same vehicle. That is, it may be understood that the combination of radar 1 and GPS 2 and the combination of radar 2 and GPS 1 are ineffective combinations.

Thereby, it may be judged that radar 1 and GPS 2 are information not corresponding to any one of the first object vehicle 20 and the second object vehicle and it may be judged that radar 2 and GPS 2 are information not corresponding to any one of the first object vehicle 20 and the second object vehicle 30.

Figure 6:
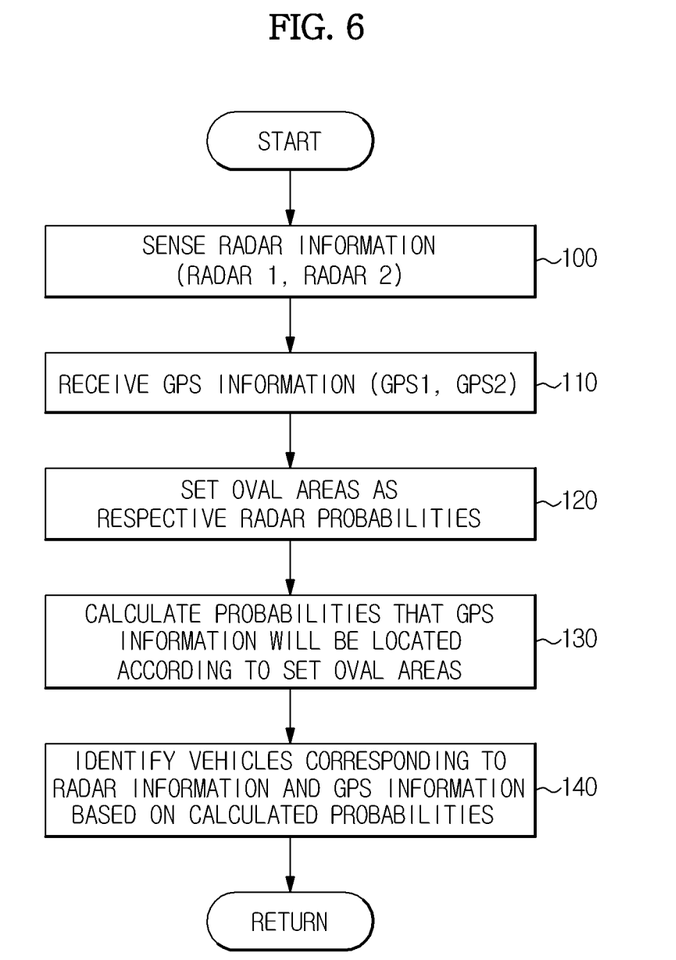
FIG. 6 is a flowchart illustrating a control method of a V2V communication-based vehicle identification apparatus in accordance with one embodiment of the present invention.

FIG. 6 is a flowchart illustrating a control method of a V2V communication-based vehicle identification apparatus in accordance with one embodiment of the present invention.

With reference to FIG. 6, the vehicle identification apparatus senses radar information through the radar sensor unit 11 (Operation 100). If a first object vehicle 20 and a second object vehicle 30 are present as neighboring vehicles, the vehicle identification apparatus senses two pieces of radar information radar 1 and radar 2.

Thereafter, the vehicle identification apparatus respectively receives GPS information of the first object vehicle 20 and GPS information of the second object vehicle 30 through the V2V communication unit 13 (Operation 110).

After reception of the GPS information through V2V communication, the vehicle identification apparatus sets oval areas as radar probabilities that object vehicles will be located based on the sensed radar information (Operation 120).

After setting of the oval areas as the radar probabilities, the vehicle identification apparatus calculates probabilities that GPS information will be located according to the set oval areas (Operation 130). Calculation of the probabilities uses, for example, Markov localization.

Thereafter, the vehicle identification apparatus identifies vehicles corresponding to the radar information and the GPS information based on the calculated probabilities (Operation 140). That is, among four situations radar 1 & GPS 1 60, radar 1 & GPS 2 61, radar 2 & GPS 1 62, and radar 2 & GPS 2 63, combinations corresponding to large probability values are selected, and vehicles corresponding to the selected combinations are identified.

As is apparent from the above description, a vehicle-to-vehicle (V2V) communication-based vehicle identification apparatus and an identification method thereof in accordance with one embodiment of the present invention perform stochastic analysis using GPS information and radar sensing information through vehicle communication and identify neighboring vehicles based on the stochastic analysis, thus more accurately identifying the neighboring vehicles.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A V2V communication-based vehicle identification apparatus comprising:
    a radar sensor unit sensing radar information corresponding to relative distances to object vehicles;
    a GPS module unit generating GPS information from GPS satellites;
    a V2V communication unit transmitting the generated GPS information to the object vehicles and receiving GPS information of the object vehicles from the object vehicles through vehicle to vehicle (V2V) communication; and
    a controller calculating probabilities that the GPS information of the object vehicles is located within reference areas, which are determined based on the sensed radar information, and identifying one or more vehicles corresponding to the radar information and the GPS information of the object vehicles based on the calculated probabilities,
    wherein the controller selects at least one combination of which a probability value among the calculated probabilities is larger than a reference value, and identifies one or more vehicles corresponding to the radar information and the GPS information of the selected combination.

2. The V2V communication-based vehicle identification apparatus according to claim 1, wherein the controller sets oval areas as areas where the object vehicles are located based on the sensed radar information.

3. The V2V communication-based vehicle identification apparatus according to claim 2, wherein in the oval areas, only linear radar detection is permitted.

4. The V2V communication-based vehicle identification apparatus according to claim 1, wherein the controller calculates the probabilities Bel($x_t$) that the GPS information of the object vehicles will be located using Equation 1 below, $$bel(x_t) = \eta p(z_t \mid x_t)\overline{bel(x_t)}$$ [Equation 1]

$$\overline{Bel(x_{t+1})} = \int p(x_{t+1} \mid x_t) bel(x_t) dx_t$$

$$= \sum_{x_t} p(x_{t+1} \mid x_t) bel(x_t)$$

here, $\eta$ is a normalization constant, $z_t$ is an improved relative distance between a processed GPS position and a radar position, $p(z_t \mid x_t)$ is a measurement accuracy probability, and $p(x_t+1 \mid x_t)$ is a state transition update probability.

5. A V2V communication-based vehicle identification method comprising:
    sensing, by a radar sensor unit radar, information corresponding to relative distances to object vehicles;
    receiving, by a V2V communication unit, GPS information of the object vehicles from the object vehicles;
    setting, by a controller, oval areas within which the object vehicles are located based on the sensed radar information;
    calculating, by the controller, probabilities that the GPS information of the object vehicles is located within the set oval areas;
    identifying, by the controller, one or more vehicles corresponding to the radar information and the GPS information of the object vehicles based on the calculated probabilities; and
    selecting at least one combination of which a probability value among the calculated probabilities is larger than a reference value, and identifying one or more vehicles corresponding to the radar information and the GPS information of the selected combination.

6. The V2V communication-based vehicle identification method according to claim 5, wherein in the oval areas, only linear radar detection is permitted.

7. The V2V communication-based vehicle identification method according to claim 5, wherein the probabilities Bel($x_t$) that the GPS information of the object vehicles will be located are calculated using Equation 1 below, $$bel(x_t) = \eta p(z_t \mid x_t)\overline{bel(x_t)}$$ [Equation 1]

$$\overline{Bel(x_{t+1})} = \int p(x_{t+1} \mid x_t) bel(x_t) dx_t$$

$$= \sum_{x_t} p(x_{t+1} \mid x_t) bel(x_t)$$

here, $\eta$ is a normalization constant, $z_t$ is an improved relative distance between a processed GPS position and a radar position, $p(z_t \mid x_t)$ is a measurement accuracy probability, and $p(x_t+1 \mid x_t)$ is a state transition update probability.

* * * * *